(12) United States Patent
Rollins et al.

(10) Patent No.: US 10,320,266 B2
(45) Date of Patent: Jun. 11, 2019

(54) COOLING TOWER HAVING THERMALLY MANAGED MOTOR

(71) Applicant: Prime Datum, Inc., Canandaigua, NY (US)

(72) Inventors: Patrick M. Rollins, Canandaigua, NY (US); George Lucas, Hammandsport, NY (US)

(73) Assignee: Prime Datum Development Company, LLC, Canandaigua, NY (US)

( * ) Notice: Subject to any disclaimer, the term of this patent is extended or adjusted under 35 U.S.C. 154(b) by 169 days.

(21) Appl. No.: 15/327,864

(22) PCT Filed: Jul. 21, 2015

(86) PCT No.: PCT/US2015/041312
§ 371 (c)(1),
(2) Date: Jan. 20, 2017

(87) PCT Pub. No.: WO2016/014517
PCT Pub. Date: Jan. 28, 2016

(65) Prior Publication Data
US 2017/0205161 A1 Jul. 20, 2017

Related U.S. Application Data

(60) Provisional application No. 62/027,100, filed on Jul. 21, 2014, provisional application No. 62/049,105, filed on Sep. 11, 2014.

(51) Int. Cl.
*H02K 9/06* (2006.01)
*H02K 1/32* (2006.01)
(Continued)

(52) U.S. Cl.
CPC .................. *H02K 9/06* (2013.01); *F28C 1/00* (2013.01); *F28F 25/06* (2013.01); *F28F 25/10* (2013.01);
(Continued)

(58) Field of Classification Search
CPC ........ F28C 1/00; F28C 2001/006; F28F 25/06; F28F 25/10; F28F 2025/005;
(Continued)

(56) References Cited

U.S. PATENT DOCUMENTS 3,083,312 A 3/1963 Moore
3,840,067 A 10/1974 Bos
(Continued)

FOREIGN PATENT DOCUMENTS

WO WO 01/05017 1/2001

OTHER PUBLICATIONS

Supplemental European Search Report, dated Jan. 2018.

*Primary Examiner* — Charles S Bushey
(74) *Attorney, Agent, or Firm* — Raymond A. Nuzzo

(57) ABSTRACT

The present invention is directed to a cooling tower that has a cooling tower structure having fill material supported by the cooling tower structure and configured to receive heated process fluid and a motor mounted to the cooling tower structure. The motor has a casing and a rotatable shaft and is sealed to prevent fluids, moisture, foreign particles and contaminants from entering the casing. A fan is connected to the rotatable shaft of the motor. Rotation of the rotatable shaft rotates the fan thereby inducing an upward moving mass flow of cool air through the fill material. A basin is attached to the cooling tower structure for collecting cooled fluid. A fluid distribution system distributes the cooled fluid in the basin. The fluid distribution system has a pumping device to pump cooled fluid from the basin, fluid piping to
(Continued)

receive the pumped cooled fluid and fluid spray devices fluidly connected to the fluid piping for spraying fluid on the casing of the motor so as to transfer heat of the casing to the fluid.

10 Claims, 3 Drawing Sheets

(51) Int. Cl.
*H02K 9/02* (2006.01)
*H02K 9/22* (2006.01)
*F28C 1/00* (2006.01)
*F28F 25/10* (2006.01)
*H02K 7/14* (2006.01)
*F28F 25/06* (2006.01)
*H02K 5/10* (2006.01)
*F28F 25/00* (2006.01)

(52) U.S. Cl.
CPC .............. *H02K 1/32* (2013.01); *H02K 5/10* (2013.01); *H02K 7/14* (2013.01); *H02K 9/02* (2013.01); *H02K 9/22* (2013.01); *F28C 2001/006* (2013.01); *F28F 2025/005* (2013.01); *F28F 2250/08* (2013.01)

(58) Field of Classification Search
CPC ......... F28F 2250/08; H02K 1/32; H02K 5/10; H02K 7/14; H02K 9/02; H02K 9/06; H02K 9/22
USPC .............................................. 261/30, DIG. 11
See application file for complete search history.

(56) References Cited

U.S. PATENT DOCUMENTS

| 6,070,860 | A | 6/2000 | Kinney | |
|---|---|---|---|---|
| 6,198,183 | B1 | 3/2001 | Baeumel | |
| 8,628,066 | B2* | 1/2014 | Boyd | F28C 1/00 261/112.1 |
| 8,629,640 | B2* | 1/2014 | Rollins | F04D 15/00 318/400.41 |
| 2007/0187851 | A1* | 8/2007 | Facius | F28C 1/14 261/161 |
| 2008/0197515 | A1 | 8/2008 | Facius | |
| 2009/0206687 | A1 | 8/2009 | Woody | |
| 2014/0130535 | A1 | 5/2014 | Santoro | |

* cited by examiner

COOLING TOWER HAVING THERMALLY MANAGED MOTOR

CROSS-REFERENCE TO RELATED APPLICATIONS

This application claims the benefit of and priority to U.S. application Ser. No. 62/027,100, filed Jul. 21, 2014 and to U.S. application Ser. No. 62/049,105, filed Sep. 11, 2014. The entire disclosures of the aforesaid U.S. application Ser. Nos. 62/027,100 and 62/049,105 are hereby incorporated by reference.

TECHNICAL FIELD

The present invention is directed to cooling towers that have thermally managed motors.

BACKGROUND ART

Wet cooling towers that have direct-drive fan systems utilize a motor that directly drives the cooling tower fan. During operation of such motors, excessive heat may be generated in the stator windings, rotor, casing or other portions of the motor. In order to prevent such excessive heat from damaging the motor, reducing its performance or shortening its operational life, it is necessary to remove or significantly reduce such heat. On the other hand, in extremely cold conditions, it may be necessary to increase the temperature of the motor in order to prevent the motor from freezing.

What is needed is an improved cooling tower wherein the cooling tower motor can be thermally managed depending upon the operational and environmental conditions under which the motor operates. It is essential that the aforesaid improved cooling tower does not utilize any auxiliary equipment that will increase the weight and cost of the cooling tower.

DISCLOSURE OF THE INVENTION

A cooling tower motor will have a preferred range of operating temperatures for best efficiency based on outside environmental conditions (e.g. temperature, wind, etc.), process conditions (e.g. water temperature, flow, etc.) and motor operating speed (e.g. internal temperature, etc.). Therefore, temperature is a significant factor that has an effect on sealing, rotor-to-stator clearance, motor volume changes, etc. Thus, an object of the invention is not only to cool or heat the motor, but to maintain a temperature that provides the best operating efficiency for the motor.

In some embodiments, the present invention is directed to cooling towers having fluid-cooled direct-drive motors. An important feature of the cooling tower embodiments disclosed herein is the utilization of a sealed, direct-drive motor. Since the direct-drive motor is sealed, foreign particles, contaminants, fluid and moisture cannot enter the motor housing or casing. The cooling tower is configured so that existing cooling tower fluid is applied to the exterior surface of the motor casing in order to achieve a transfer of heat from the motor casing to the fluid thereby substantially reducing or removing the heat from the casing. The present invention avoids the use of relatively heavy, complex and expensive auxiliary cooling devices in the wet cooling tower.

In some embodiments, the present invention is directed to a cooling tower comprising a cooling tower structure comprising a fan deck, fill material supported by the cooling tower structure and configured to receive heated process fluid and a motor secured or mounted to the fan deck. The motor comprises a casing or housing and a rotatable shaft. The motor is sealed to prevent fluids, moisture, foreign particles and contaminants from entering the casing. The wet cooling tower further comprises a fan connected to the rotatable shaft of the motor. Rotation of the rotatable shaft rotates the fan thereby inducing an upward moving mass flow of cool air through the fill material. A basin is attached or mounted to the cooling tower structure for collecting cooled fluid. The wet cooling tower further comprises a fluid distribution system to distribute the cooled fluid collected in the basin. The fluid distribution system comprises a pumping device to pump cooled fluid from the basin, fluid piping to receive the pumped cooled fluid and at least one fluid spray device fluidly connected to the fluid piping for spraying fluid on the casing of the motor so as to cause a transfer of heat from the casing to the fluid. In a preferred embodiment, the fluid distribution system comprises a plurality of fluid spray devices fluidly connected to the fluid pipes. In a preferred embodiment, each fluid spray device is configured to emit a mist of fluid in order to achieve maximum coverage of the motor casing.

Other embodiments of the present invention are also described herein.

BEST MODE FOR CARRYING OUT THE INVENTION

Wet cooling towers are described in U.S. Pat. No. 8,111,028 entitled "Integrated Fan Drive System For Cooling Tower" and international application no. PCT/US2012/061244 entitled "Direct Drive Fan System With Variable Process Control" and published under International Publication No. WO 2013/059764. The entire disclosure of U.S. Pat. No. 8,111,028 is hereby incorporated by reference. The entire disclosure of international application no. PCT/US2012/061244 is hereby incorporated by reference.

As used herein, the term "fluid" includes water, either pure or with chemical and/or organic additives, and any other fluid that is suitable for application to the motor casing in order to cool the motor.

As used herein, the terms "casing" and "housing" have the same meaning and are used interchangeably.

As used herein, the term "process" means an industrial process such as a petroleum refinery, power plant, turbine, crude cracker, fertilizer plant, glass manufacturing plant, chemical plant, etc.

As used herein, the terms "process fluid" or "process liquids" shall mean fluids or liquids, such as water, coolant or a combination thereof, used for cooling purposes in the "process".

Figure 1:
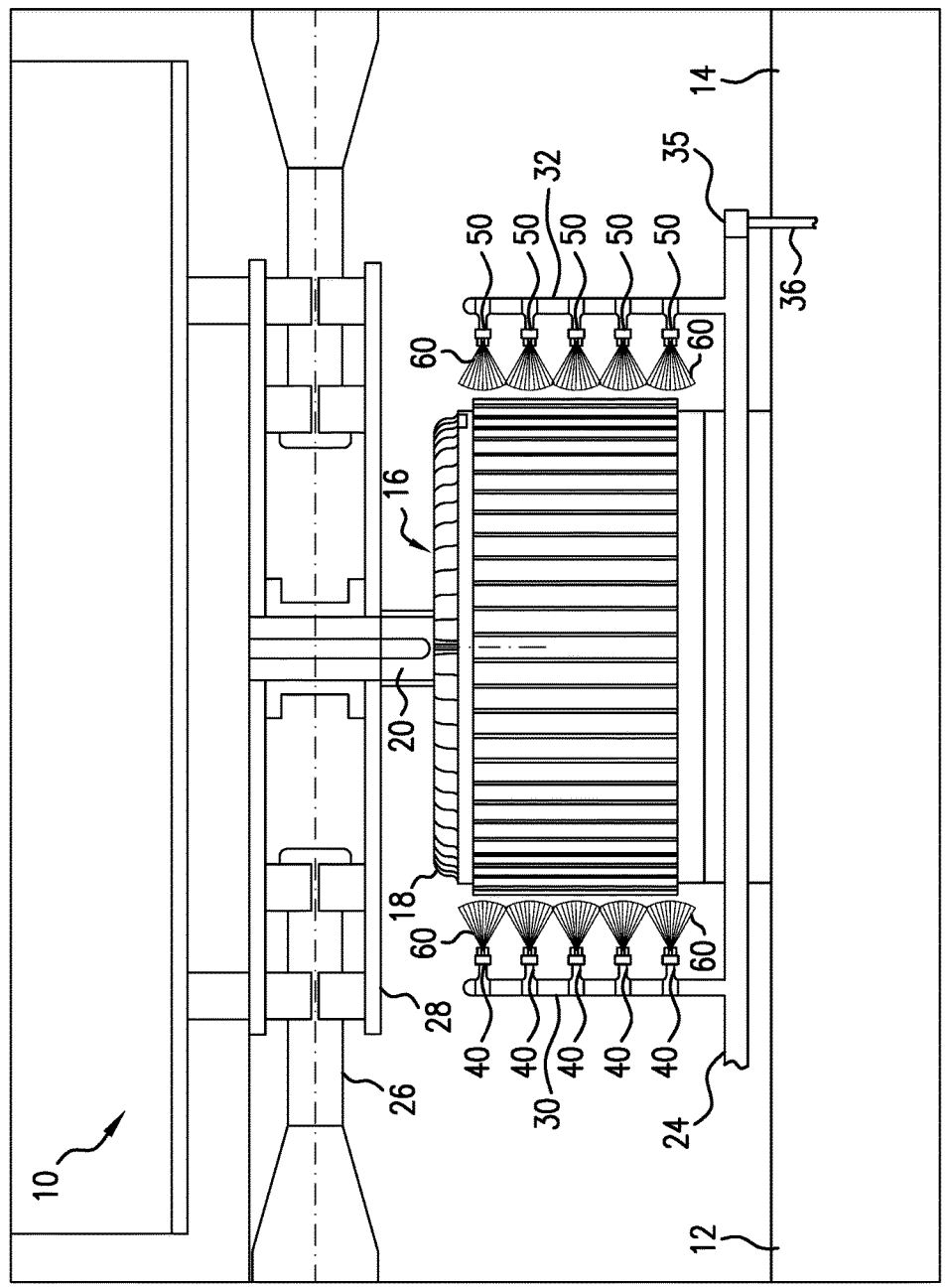
FIG. 1 is a side elevational view illustrating a portion of a cooling tower in accordance with one embodiment of the present invention, wherein the cooling tower utilizes spray devices positioned beside the cooling tower motor for spraying fluid on the motor casing, the view not showing the fan stack of the cooling tower or a complete view of the cooling tower fan in order to simplify the drawing.
Figure 2:
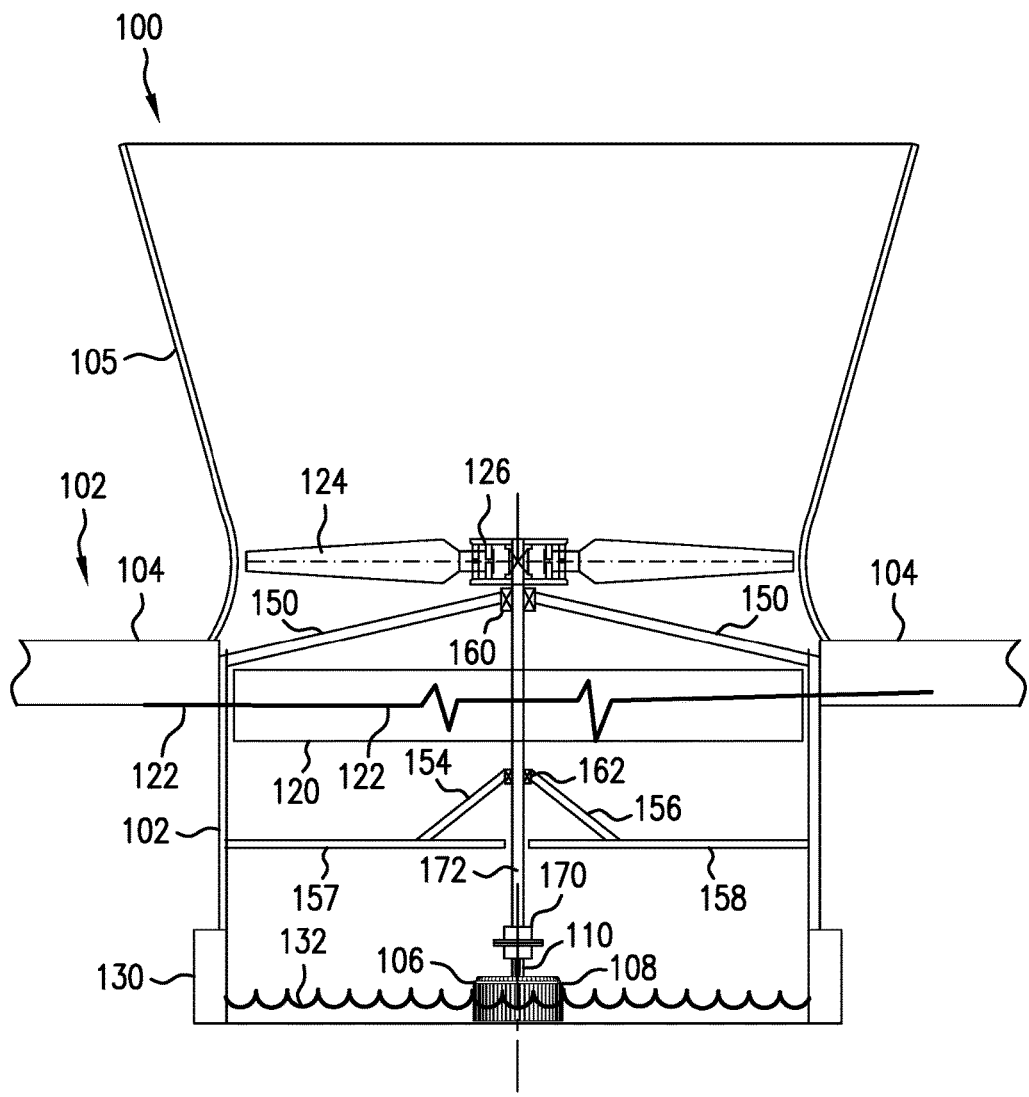
FIG. 2 is a side elevational view illustrating a cooling tower in accordance with another embodiment of the present invention, wherein the cooling tower motor is positioned in the fluid in the basin.
Figure 3:
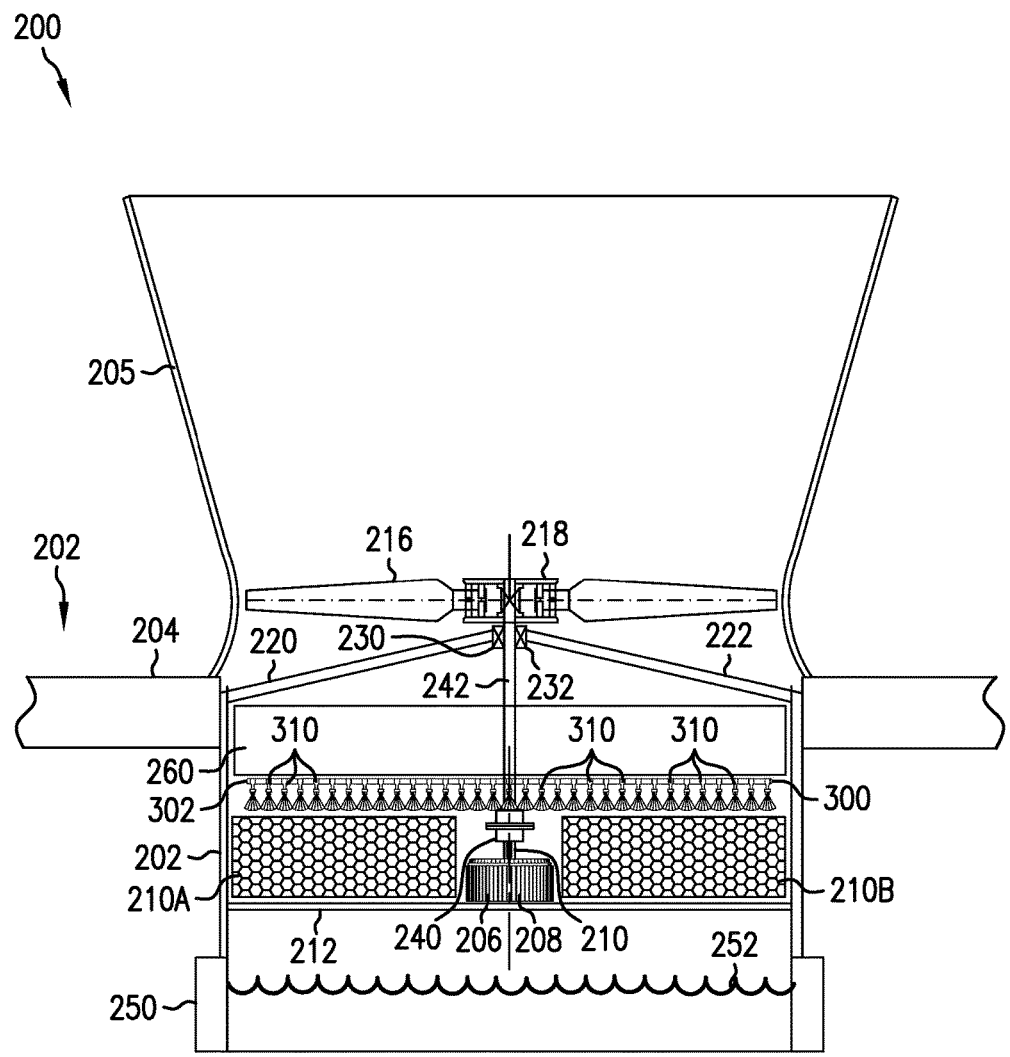
FIG. 3 is a side elevational view illustrating a cooling tower in accordance with a further embodiment of the present invention, wherein the cooling tower motor is positioned between sections of cooling tower fill material and beneath fluid spray devices that spray fluid on the motor casing.

Referring to FIG. 1, there is shown wet cooling tower 10 in accordance with one embodiment of the invention. Wet cooling tower 10 comprises cooling tower structure 12. Cooling tower structure 12 comprises fan deck 14. Sealed, variable speed, load bearing electric motor 16 is secured to fan deck 14. Motor 16 comprises casing or housing 18, a stator within the casing (not shown), a rotor within the casing (not shown) and rotatable shaft 20 that is attached to the rotor. Since motor 16 is sealed, foreign particles, contaminants and moisture cannot enter motor casing 18. In one embodiment, sealed motor 16 is configured as the sealed permanent magnet motor described in the aforementioned International Application No. PCT/US2012/061244. Fill material (not shown) is supported by cooling tower structure 12 and is configured to receive heated process fluid that was used in a process, e.g. cracking crude, etc. The fill material is not shown FIG. 1 but it is shown in the embodiments of FIGS. 2 and 3. The use of the fill material is well known in the industry and is therefore not discussed in detail herein. Wet cooling tower 10 further comprises fan 26. Fan 26 has fan hub 28 which is connected to rotatable shaft 20. Rotation of rotatable shaft 20 rotates fan 26 thereby inducing an upward moving mass flow of cool air through the fill material. Wet cooling tower 10 further comprises a basin for collecting cooled fluid. The basin is not shown in FIG. 1 but is shown in the embodiments of FIGS. 2 and 3. Wet cooling tower 10 includes fluid distribution system 24 that contains pressurized cooling fluid. This cooling fluid has already been evaporated and cooled and is pumped from the basin and through fluid distribution system 24. Fluid distribution system 24 includes fluid pipes 30 and 32 that are positioned in proximity to motor 16. As shown in FIG. 1, fluid pipes 30 and 32 are positioned at different locations around motor 16. Fluid pipes 30 and 32 are substantially vertical oriented. However, fluid pipes 30 and 32 can be angulated if available space is limited. Although FIG. 1 shows two fluid pipes 30 and 32, it is to be understood that there can be more or less than two fluid pipes. When a plurality of fluid pipes are used, it is preferred that the fluid pipes are equidistantly space about motor 16. Fluid distribution system 24 includes pumping device 35 and fluid pipe 36. Fluid pipe 36 extends down into the fluid in the basin. Pumping device 35 pumps cooled fluid from the basin into the piping of fluid distribution system 24, including fluid pipes 30 and 32. Fluid distribution system 24 further comprises at least one fluid spray device 40 that is fluidly connected to fluid pipe 30. Preferably, there is a plurality of fluid spray devices 40 that are fluidly connected to fluid pipe 30. In one embodiment, each fluid spray device 40 is configured as a spray nozzle. Similarly, fluid distribution system 24 further comprises at least one fluid spray device 50 that is fluidly connected to fluid pipe 32. Preferably, there is a plurality of fluid spray devices 50 that are fluidly connected to fluid pipe 32. In one embodiment, each fluid spray device 50 is configured as a spray nozzle. Fluid spray devices 40 and 50 are configured to spray fluid 60 (e.g. water) on casing 18 of motor 16 to cause a transfer of heat from casing 18 to the fluid. In a preferred embodiment, fluid spray devices 40 and 50 are configured to emit a fluid mist in order to limit the force of the fluid and to maximize motor surface coverage.

In one embodiment, the water that is applied to the motor casing is tapped from the existing cooling tower header carrying the hot process fluid.

In one embodiment, fluid spray devices 40 and 50 are continuously spraying fluid on motor 16. In an alternate embodiment, an electric valve network is used that allows fluid spray devices 40 and 50 to spray fluid on motor 16 only when the temperature of motor casing 18 exceeds a threshold temperature. In such an embodiment, moisture and corrosion proof temperature sensors are mounted to the exterior of motor casing 18. An electric valve controls the flow of fluids to fluid pipes 30 and 32 and is electrically connected to the temperature sensors. The electric valve is closed when the temperature sensors indicate the temperature of the motor casing 18 is below the threshold. When the temperature of the motor casing 18 exceeds the threshold, the temperature sensor outputs a signal which causes the electric valve to open so as to allow fluid spray devices 40 and 50 to spray fluid on motor 16. Temperature sensors may also be used within the interior of casing 18. Suitable external and internal temperature sensors are described in the aforementioned International Application No. PCT/US2012/061244.

In one embodiment, wet cooling tower 10 comprises a fan stack (not shown) that is connected to the fan deck. The fan rotates within the fan stack. The fan stack is not shown in FIG. 1 but a fan stack is shown in the embodiments of FIGS. 2 and 3. In another embodiment, wet cooling tower 10 does not use a fan stack but instead, uses a fan cylinder (not shown) which is connected to the fan deck. In such an embodiment, the fan rotates within the fan cylinder. The function and purpose of fan stacks and fan cylinders are well known in the industry and are therefore not described in detail.

In an alternate embodiment, a fluid spray bar is attached to fan hub 28 and fluid is provided to the fluid spray bar with a rotating union or similar device in order to create a rotating spray bar system. Fluids discharged from the rotating spray bar system eventually seep back into the basin. In one embodiment, this fluid spray bar is attached to the bottom of the fan hub 28.

In an alternate embodiment, air and fluid are emitted through the spray bars. Such a configuration can be combined with vortex or vortec coolers and separate blower systems.

In another embodiment, cooled fluid in the basin is pumped into the fluid pipes 30 and 32, or into spray bar 302 (see FIG. 3).

In an alternate embodiment, a mixing valve and temperature sensors are used to mix hot process fluid and cooled basin fluid accordingly. Alternately, a third fluid stream is provided to make up the required temperature differential.

In alternate embodiments, heaters and heat exchangers are used to obtain the desired temperature of the fluid that will be used to cool the motor.

In an alternate embodiment, hot process water is pumped into the fluid pipes 30 and 32, or spray bar 302 (see FIG. 3) to prevent the motor from freezing in cold temperature.

Referring to FIG. 2, there is shown wet cooling tower 100 in accordance with another embodiment of the invention. Wet cooling tower 100 comprises cooling tower structure 102. Cooling tower structure 102 comprises fan deck 104, fan stack 105 and basin 130. Fan stack 105 is connected or mounted to fan deck 104. Wet cooling tower 100 further comprises sealed, load bearing electric motor 106 that is positioned within basin 130. Motor 106 comprises casing or housing 108, a stator within the casing (not shown), a rotor within the casing (not shown) and rotatable shaft 110 that is attached to the rotor. Since motor 106 is sealed, fluids, foreign particles, contaminants and moisture cannot enter motor casing 108. In one embodiment, sealed motor 106 is configured as the sealed, permanent magnet motor described in the aforementioned International Application No. PCT/US2012/061244. As shown in FIG. 2, fluid 132 in basin 130 covers a substantial portion of motor casing 108. Since motor 106 is sealed, motor 106 can be totally submerged in fluid 132. Substantially all of the heat of motor casing 108 is transferred to fluid 132.

Fill material 120 is supported by cooling tower structure 102. Cooling tower fluid distribution system 122 extends through fill material 120 to distribute fluid to the fill material 120. Wet cooling tower 100 further comprises fan 124 which has fan hub 126. Cooling tower structure 102 includes structural members 150, 152, 154, 156, 157 and 158. The fan 126 is supported by structural members 150, 152, 154, 156, 157 and 158, and bearings 160 and 162. Therefore, motor 106 does not support the fan loads. Coupling 170 couples the rotatable shaft 110 to an extended drive shaft 172. The extended drive shaft 172 is connected to fan hub 126. Rotation of rotatable shaft 110 rotates drive shaft 172 and fan 126. Rotation of fan 126 induces an upward moving, mass flow of cool air through fill material 120.

In an alternate embodiment, an electric valve and temperature sensors, as described with respect to the embodiment of FIG. 1, may also be used with motor 106.

Referring to FIG. 3, there is shown wet cooling tower 200 in accordance with another embodiment of the invention. Wet cooling tower 200 comprises cooling tower structure 202. Cooling tower structure 202 comprises fan deck 204 and fan stack 205 which is attached to fan deck 204. Cooling tower structure 202 further comprises horizontal structural member 212. Sealed, variable speed, load bearing, electric motor 206 is secured or mounted to horizontal structural member 212. Motor 206 comprises casing or housing 208, a stator within the casing (not shown), a rotor within the casing (not shown) and rotatable shaft 210 that is attached to the rotor. Since motor 206 is sealed, foreign particles, contaminants, fluids and moisture cannot enter motor casing 208. In one embodiment, sealed motor 206 is configured as the sealed permanent magnet motor described in the aforementioned International Application No. PCT/US2012/061244. Cooling tower 200 includes fill material which is comprised of fill material sections 210A and 210B. Fill material sections 210A and 210B are supported by cooling tower structure 202. Motor 206 is positioned between fill material sections 210A and 210B. Wet cooling tower 200 further comprises fan 216. Fan 216 has fan hub 218 and rotates within fan stack 205. Cooling tower structure 202 includes structural members 220 and 222. Fan 216 is supported by structural members 220 and 222, and bearings 230 and 232. Thus, motor 206 does not support the fan loads. Coupling 240 couples the rotatable shaft 210 to an extended drive shaft 242. The extended drive shaft 242 is connected to fan hub 218. Therefore, rotation of rotatable shaft 210 rotates drive shaft 242 which causes rotation of fan 216. Rotation of fan 216 induces an upward moving mass flow of cool air through fill material sections 210A and 210B. Wet cooling tower 200 further comprises basin 250 for collecting cooled fluid 252. Wet cooling tower 200 further comprises drift eliminator 260 which is attached to cooling tower structure 202 and positioned over motor 206 and fill material sections 210A and 210B. Drift eliminators are well known in the art and are therefore not discussed herein.

Wet cooling tower 200 includes fluid distribution system 300 that contains pressurized cooling water. This cooling water has already been evaporated and cooled and is pumped from the basin and through fluid distribution system 300 with a pumping device similar to pumping device 35 shown in FIG. 1. Fluid distribution system 300 includes cooling tower spray bar 302 which is supported by cooling tower structure 202 and positioned over motor 206 and fill material sections 210A and 210B. In one embodiment, cooling tower spray-bar 302 is part of the existing cooling tower fluid distribution system. Fluid distribution system 300 further comprises a plurality of fluid spray devices or nozzles 310 that are fluidly connected to cooling tower spray bar 206. Fluid spray devices 310 are configured to spray fluid on motor casing 208 to cause a transfer of heat from motor casing 208 to the fluid. In a preferred embodiment, fluid spray devices 310 are configured to emit a fluid mist in order to limit the force of the fluid and to maximize motor surface coverage.

In an alternate embodiment, cooling tower structure 202 has a fan cylinder instead of fan stack 205.

In an alternate embodiment, the embodiments of FIGS. 1 and 3 are combined so that fluid is sprayed on the motor from above and from the sides.

The foregoing embodiments of the invention may be implemented and realized regardless of the orientation of the cooling fan. This means that the embodiments of the invention may be implemented and realized whether the cooling tower fan is above the motor or below the motor. Furthermore, the foregoing embodiments of the invention may be implemented and realized regardless of the direction of airflow in the cooling tower.

In a preferred embodiment, motors 16, 106 and 206 have the bearing and seal configuration that is described in the aforementioned international application no. PCT/US2012/061244. As a result of this novel bearing and seal design, motors 16, 106 and 206 do not require oil-bath lubrication unlike prior art gearboxes. As a result, motors 16, 106 and 206 can be arranged in any orientation, e.g. horizontal, vertical, motor shaft down, motor shaft up, angular, etc.

In the case of dry cooling towers, such as the type described in U.S. Pat. No. 8,188,698, water can be pumped to the dry cooling tower for use in cooling the motor. In such an embodiment, water delivery devices can be positioned above the motor and/or around the motor.

In other embodiments, compressed air is used instead of water to cool the motor. In such an embodiment, a compressed air source is located outside of the fan stack. Compressed air is suitable for cooling or heating motors used in dry cooling towers such as the type disclosed in the aforementioned U.S. Pat. No. 8,188,698.

In such an embodiment, compressed air conduits are routed from the compressed air source to the tower and arranged so that compressed air can be discharged on the motor from any angle.

In a further embodiment, pressurized hot water that is returned from the process is combined with pressurized cooler water from the basin feed to the process so as to provide a suitable temperature via mixing valves and thermostats. Alternatively, a third make-up water source can be used as required to make up the required temperature differential so as to provide a suitable temperature to the motor (hot or cold) to maintain optimum motor efficiency through various environmental conditions and process loads.

The cooling tower systems disclosed herein can be used with or controlled by the control systems disclosed in the aforementioned international application no. PCT/US2012/061244 entitled "Direct Drive Fan System With Variable Process Control".

The present invention may be implemented regardless of the orientation of the cooling tower motor or fan. Thus, the invention may be applied to cooling towers wherein the motor is above or below the fan or if the motor is positioned right side up (shaft up) or upside down (shaft down). The invention can be applied to wet cooling towers, dry cooling towers and mechanical towers. Since motors 16, 106 and 216 are sealed, the motor can be in any position or orientation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A cooling tower comprising:
   a cooling tower structure;
   fill material supported by the cooling tower structure and configured to receive heated process fluid;
   a motor mounted to the cooling tower structure, the motor comprising a casing and a rotatable shaft, the motor being sealed to prevent fluids, moisture, foreign particles and contaminants from entering the casing;
   a fan connected to the rotatable shaft of the motor, wherein rotation of the rotatable shaft rotates the fan thereby inducing an upward moving mass flow of cool air through the fill material;
   a basin attached to the cooling tower structure for collecting cooled fluid; and
   a fluid distribution system to distribute the cooled fluid in the basin, the fluid distribution system comprising a pumping device to pump cooled fluid from the basin, fluid piping to receive the pumped cooled fluid and at least one fluid spray device fluidly connected to the fluid piping for spraying fluid on the casing of the motor so as to cause a transfer of heat from the casing to the fluid.

2. The cooling tower according to claim 1 wherein the cooling tower structure further comprises a fan stack, wherein the fan rotates within the fan stack.

3. The cooling tower according to claim 1 wherein the at least one fluid spray device comprises a spray nozzle.

4. The cooling tower according to claim 1 wherein the at least one fluid spray device is located beside the motor.

5. The cooling tower according to claim 1 wherein the fluid piping comprises a plurality of fluid pipes located at predetermined locations about the motor, wherein at least one fluid spray device is fluidly connected to each fluid pipe.

6. The cooling tower according to claim 5 wherein the fluid pipes are substantially vertical.

7. The cooling tower according to claim 1 wherein the fluid distribution system comprises a cooling tower spray bar positioned over the motor, the fluid distribution system further comprising a plurality of fluid spray devices that are fluid connected to the cooling tower spray bar.

8. The cooling tower according to claim 7 wherein the fill material comprises two sections and wherein the motor is positioned between the sections of fill material.

9. A cooling tower comprising:
   a cooling tower structure;
   fill material supported by the cooling tower structure and configured to receive heated process fluid;
   a basin attached to the cooling tower structure for collecting cooled fluid;
   a sealed, load bearing electric motor comprising a casing, and a rotatable shaft, the electric motor being positioned within the basin so that the cooled fluid in the basin contacts the casing of the motor such that heat of the casing is transferred to the fluid; and
   a fan connected to the rotatable shaft of the motor, wherein rotation of the rotatable shaft rotates the fan to induce an upward moving mass flow of cool air through the fill material.

10. The cooling tower according to claim 9 further comprising a fluid distribution system to distribute fluid to the fill material.

* * * * *